May 1, 1956  C. F. CLIFFORD  2,743,614
MECHANICAL OSCILLATORS

Filed July 10, 1951  3 Sheets-Sheet 1

INVENTOR
C.F. CLIFFORD
By Rockwell & Bartholow
Attorneys.

May 1, 1956 C. F. CLIFFORD 2,743,614
MECHANICAL OSCILLATORS
Filed July 10, 1951 3 Sheets-Sheet 2
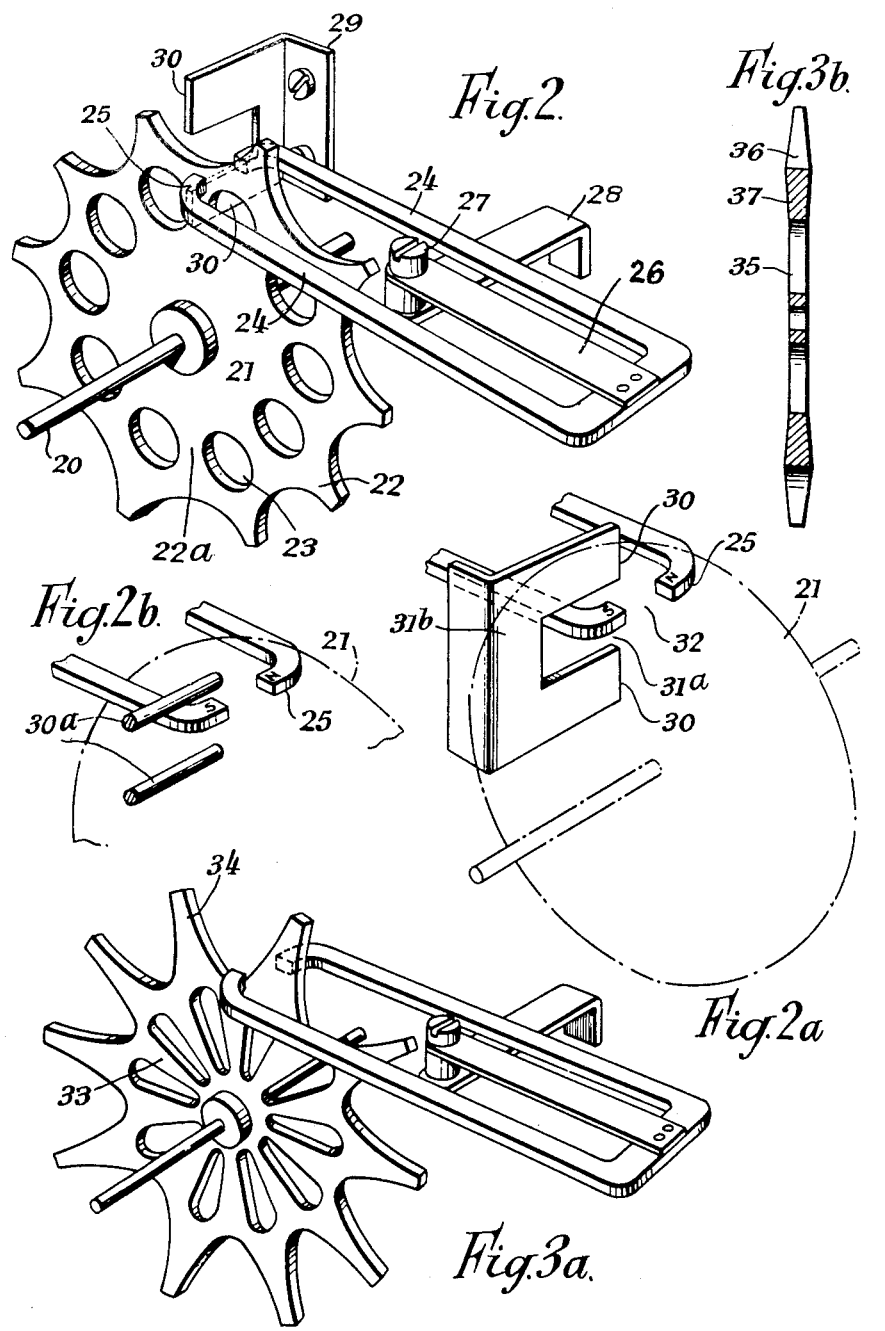
INVENTOR
C. F. CLIFFORD
By Rockwell & Bartholow
Attorneys May 1, 1956 C. F. CLIFFORD 2,743,614
MECHANICAL OSCILLATORS
Filed July 10, 1951 3 Sheets-Sheet 3

INVENTOR
C. F. CLIFFORD
By Rockwell & Bartholow
Attorneys.

United States Patent Office 2,743,614
Patented May 1, 1956

2,743,614

MECHANICAL OSCILLATORS

Cecil Frank Clifford, Bath, England

Application July 10, 1951, Serial No. 236,019

Claims priority, application Great Britain July 15, 1950

10 Claims. (Cl. 74—1.5)

This invention relates to mechanical oscillators, and is particularly, but not exclusively applicable to magnetic escapement mechanism, of the kind hereinafter called "the kind referred to" in which relatively rotatable and oscillatable parts, the latter subject to a restoring force giving a natural frequency of oscillation with substantial isochronism, are coupled together by means of a magnetic coupling. Several examples of magnetic escapement mechanism of the kind referred to are described in prior United States Patent No. 2,554,523 and pending applications, Serial Nos. 737,279; 96,747; 105,223, and 163,607.

The expression "magnetic coupling" is used herein to define the coupling between the aforesaid relatively movable parts wherein the motion of rotation is coupled at all times to the motion of oscillation by magnetic flux between at least one pole-shaped member and a wavy track whereby the combined relative rotational and oscillatory movement of the parts results in the relative following of such track by the said pole-shaped member so as to provide the pre-requisite condition of "escapement" in which the frequency of oscillation determines the speed of rotation.

If an oscillating part is carried by a resilient member, such as a reed, the resilience of which provides the restoring force for oscillation, and if due regard is paid to keeping stresses in such resilient member reasonably low, then as the returning force is substantially directly proportional to displacement a reasonably isochronous oscillatable assembly is formed, i. e. the frequency of oscillation is substantially the same for all amplitudes complying with such regard.

In a wavy track type of magnetic escapement as hitherto known the wavy track was constructed with a uniform dimensional factor, that is to say of uniform width and distance relative to the complementary magnetic pole so as to give, as far as possible a magnetic coupling of uniform intensity throughout the range of relative movement of said parts. The present invention is based upon the appreciation that when an oscillatable assembly is magnetically coupled to a driving member by any of the uniformly dimensioned and non-compensated means proposed to date, an error is introduced through "parasitic magnetic forces," which expression is explained below, superimposed on the restoring force of the oscillatable assembly, with consequent departures from isochronism. Other forces inimical to isochronism are herein termed other parasitic forces. It is of course necessary in any escapement for the rotary motion to impulse the oscillatory motion, so as at least to maintain, if not also to initiate, the oscillation of the oscillatory assembly and consequently such impulsing is a force superimposed on the restoring force of the oscillatory system; but such impulsing force is a known and relatively calculable factor having little effect on isochronism. In contra-distinction to the impulsing force, the shape of some forms of wavy track and complementary pole-shaped members, convenient for manufacture and heretofore known, are such that in their relative positions during escapement, the magnetic coupling they provide has a force component, hereinafter termed a "parasitic magnetic force," superimposed on the restoring force and which has hitherto been of an order capable of substantial interference with isochronism.

According to the invention a magnetic escapement mechanism (having relatively rotatable and oscillatable parts, the latter subject to a restoring force giving substantial isochronism, coupled together by means of a magnetic coupling) of the kind referred to, is characterised by means for reducing anisochronism due to magnetic and other parasitic forces as hereinbefore defined.

According to a first embodiment of the invention means are provided for substantially eliminating the said parasitic magnetic forces.

According to a second embodiment of the invention means are provided for compensating the said parasitic magnetic forces by equal and opposite forces.

According to a third embodiment of the invention a construction is provided whereby the said parasitic forces obey the isochronous law that its component superimposed on the restoring force is proportional to deflection, so that the combined restoring force substantially obeys such law.

In the accompanying drawings:

Fig. 2 shows a construction of an escapement according to the second embodiment aforesaid;

Fig. 2a is a diagram to show the magnetic flux paths referred to in describing the operation of the escapements shown in Fig. 2, the rotor for simplicity being shown as a simple disc;

Fig. 2b is a fragmentary diagram showing a modification of the construction shown in Fig. 2;

Figs. 3a and 3b show a construction of an escapement according to the third embodiment aforesaid;

As one example of the first embodiment aforesaid for substantially eliminating the parasitic forces on say, the wavy tracks and extensions thereof, the track according to the present invention could, for example, be made thinner at the wavy track than at the extensions so that by reason of a larger air gap the centralising component of the magnetic coupling is substantially eliminated, i. e. the pole-shaped parts are no more attracted to this portion than to the extensions. As another example of such first embodiment, the wavy track part could be made less wide than the extensions but this has an adverse effect on the self-starting properties of the escapement.

Figure 1A:
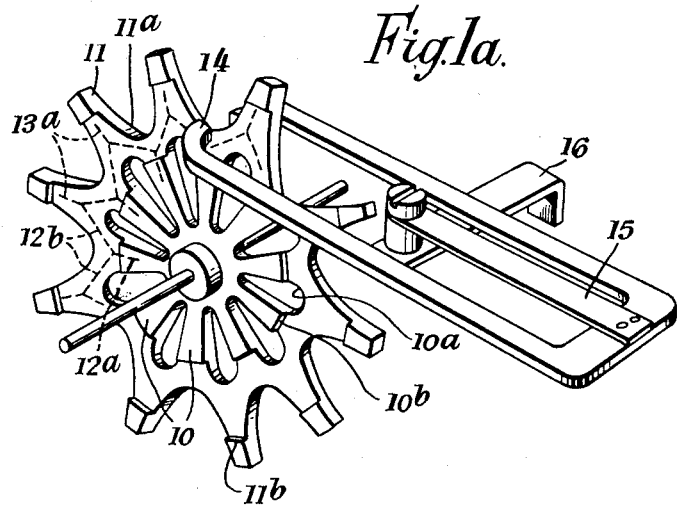
Figs. 1a and 1b show alternative constructions of an escapement according to the first embodiment aforesaid.

In the example of the invention shown in Fig. 1a there are separate rotatable and oscillatable parts; the rotatable part consists of a wheel having spokes 10 with arched apertures 10a radially in line with which are outer tooth-like projections 11 separated by U-shaped notches 11a, the arches 10a and U-shaped notches 11a being so proportioned as to form a wavy track to which the spokes 10 and tooth-like projections 11 form relatively radial extensions.

As can be seen in the drawing an annular groove producing rebates 10b and 11b on the spokes and projections respectively is shown at one side of the rotor of such width as to include the wavy track and the root portion of the said radial extensions. While, as is also shown in the drawing in dotted lines, the mean wavy track consists of a series of Y-shaped track paths alternately in opposite directions, the tails 12a and 13a respectively of the Y's form the inner and outer extensions of the track and the arms 12b collectively form the wavy track.

Associated with the rotary member is shown the oscillatory system consisting of a magnet, having inwardly directed pole formations 14, resiliently suspended from its arch by a spring 15 attached to a fixed bracket 16, the line of support being substantially at the centre of gravity of the magnet and spring assembly. The machining away of some of the thickness of the rotor, particularly at the wavy track portion, has been found to reduce substantially the parasitic forces. Such machining away is shown at one side only of the rotor but can obviously be provided at both sides. The resultant enlargement of the air gap at such portion of the track removes within the limit of practical approximation the centralising force which would otherwise obtain.

Figure 1B:
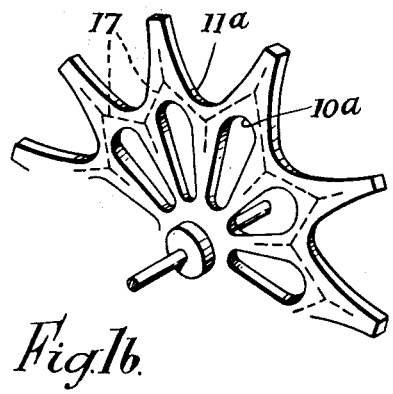

As shown in Fig. 1b the rotor compared with that illustrated in Fig. 1a has the arches 10a' and U-shaped notches 11a' relatively deeper so that the centre of the wavy track portions where the arms of the Y-shaped track section join, as indicated at 17, are narrower so as to decrease the attraction to the poles of the vibratory system at the central position for such assembly. However, the magnet poles with such construction overlap the width of such narrow section of the track, making the magnet reluctant to cross this section, and hence adversely affecting the self-starting properties. Thus narrowing of the track to reduce the section at the junction of the tail and arms of the Y-shaped portions of the track sufficient, by substantially eliminating magnetically generated centralising forces, to eliminate parasitic forces has the aforesaid disadvantage that also the portions at 17 are narrower than is desirable for the reason, inter alia, above given.

Thus, the arrangements of Figs. 1a and 1b both provide substantial elimination of the parasitic magnetic forces by so shaping the rotor as substantially to eliminate centralising forces previously present.

As an example of the second embodiment of compensation according to this invention, there is provided in the main or subsidiary fields of the magnet a compensating piece of magnetic material, which is in effect shaped to be the reverse of the driving track as regards giving rise to parasitic forces throughout the amplitude of the oscillating system.

In the example of the invention shown in Fig. 2, a driven shaft 20 carries a wheel 21, the periphery of which has teeth 22 and apertures 23 forming spokes 22a adapted collectively to form a continuous wavy track with radial extensions complementary to the pole-shaped ends of an oscillating member. The oscillating member consists of a magnet having a pair of arms 24 terminating at poles 25 normally located on each side of the said wavy track at the periphery of the wheel 21. The magnet is mounted on a resilient spring blade 26 at a point located substantially at the centre of gravity of the magnet and reed assembly and by means of a screw 27 and bracket 28.

The oscillating assembly, formed by the magnet with its spring 26, and the tooth-shaped wheel 21 co-operate to provide a "magnetic coupling." In combination with such magnetic coupling, and in furtherance of the second method above referred to, there is provided a further U-shaped magnetic element 29 located on one side of the wheel with the arms of its U extending as pole-shaped projections 30, so as to be radial relatively to the axis of the wheel, such radius being substantially in the common medial plane of the pole faces of the magnet and equally distant from such poles when the magnet is in its normal or central position.

Experiments have shown that with a magnet of .030" uniform thickness, satisfactory results are obtained with the escapement wheel of .010" thickness, and with an element 29 of the same thickness, the gap between the poles 30 of such element can conveniently be .040", while the distance between the pole faces of the magnet is .020" and the distance between the pole faces of the element 29 and the adjacent poles of the magnet is .010".

As will be seen from Fig. 2a, the above arrangement provides three paths 31a (air gaps between the projection 30), 31b (through the element 29) and 32 (air gap directly between the magnet poles) for the magnetic flux, and the combined effect is that the portion between the teeth 22 and the spokes 22a tend to attract the magnet to its mid-position. Such attraction is compensated by equal and opposite attraction from the ends of the element 29 operating to attract the magnet away from its mid-position. The attractive forces centralising and decentralising respectively from the wavy track and the magnetic element 29 are substantially equal and opposite for all positions of the magnet and wheel under normal conditions of operation, thus compensating the parasitic magnetic forces existing between the rotor and the magnet tending to centralise the magnet, by an equal and opposite decentralising force between the magnet and the ends of the element 29. Adjustment may be effected by bending the arms 30 towards or away from the ends of the magnet. An adjusting screw could be positioned to push against such arms for effecting such adjustment against the resilience of the material to bending.

As shown in Fig. 2b a pair of pins 30a take the place of the arms 30 of Fig. 2. These pins are symmetrically disposed and are of low hysteresis magnetic material of .04" diameter. The common tangent nearest to the magnet is .010" from the end thereof. The two pins are arranged with their centres .06" apart. The pins are arranged so as to be adjustable as to their height or projection from the base in which they are mounted. The effect of these pins on the vibrating magnet is exactly as above described for the arrangement of Figs. 2 and 2a.

As an example of the third embodiment of isochronising the parasitic forces, according to this invention the driving track and its extensions are so shaped that the restoring force (due to the parasitic magnetic forces) applied to the oscillator obeys the law that the magnetic restoring forces are substantially proportional to the deflection. The shaping of the track can consist for instance of tapering the thickness or the width of the magnetic track.

As shown in Fig. 3a, a wheel suitable for use with the vibratory system, such as shown with Fig. 2, is made with the spokes 33 and tooth-like projections 34 of tapered shape, that is to say, broader at the junction with the wavy track than further away from such junction, but of uniform thickness from face-to-face of the wheel.

As shown in Fig. 3b, the spoke portions 35 and tooth-like projections 36 are of tapered shape with their thicker ends joining with the wavy track zone 37. The shaping in this plane at right angles to the shaping of Fig. 3 has the same effect, that is to say, it provides, compared with a rotor not so shaped, an increased parasitic or superimposed returning force acting to centralise the vibratory system with the shaping so proportioned that such superimposed returning force substantially obeys the law for isochronism, that is to say such returning force is substantially directly proportional to displacement.

Escapement mechanism of the kind referred to generally can be improved by any of the three methods aforesaid or by a combination of any two or all such methods.

Obviously, while carrying out the invention for the removal of isochronous errors arising from parasitic magnetic forces the modification adopted may depart slightly from absolute correction of the parasitic magnetic force so as to compensate also for other known factors causing errors of isochronism, such departure being within the scope of the present invention. For instance, it has also been found that with no escape wheel present, if the oscillator is deflected by hand and then released the vibrations as they die down change in frequency, being usually faster on the smaller amplitudes. Such errors of isochronism due to forces other than parasitic magnetic forces, can be compensated by any of the means above described.

Figure 4:
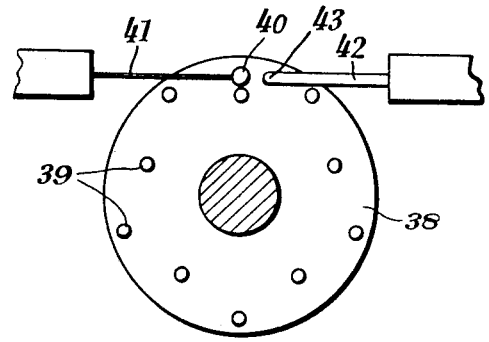
Figs. 4 and 5 are elevation and plan of another construction.
Figure 5:
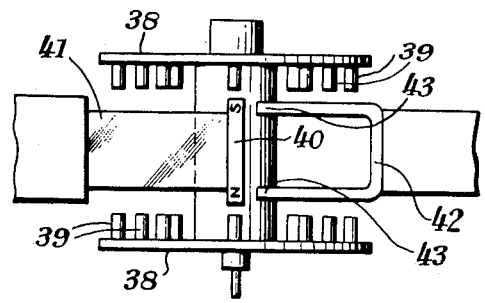

As shown in Figs. 4 and 5 the rotor consists of a pair of discs 38 in each of which are pins 39 of magnetic material arranged in regular staggered formation relative to a circular line about the axis of the rotor, the pins of one disc being immediately opposite those of the other. Located between said discs is an oscillator consisting of a magnet 40 transversely attached to the end of a flat spring 41, the magnet being of such length that it is less than the distance between opposite pins. In line with and immediately opposed to the oscillator is a U-shaped compensator 42, the ends 43 of which may be adjusted towards or away from the poles of the oscillator magnet.

This arrangement operates to provide a centralising force acting in opposition to the decentralising force of the staggered pins on the rotor and this centralising force can be so proportioned as to be equal and opposite to the mean decentralising force and thereby improve the isochronism for the pin type construction of magnetic escapement.

While the invention has been described above with particular reference to escapement mechanism for time pieces it is also suitable as a mechanical oscillator to provide the time base in an electronic circuit. For instance, the oscillator would be inductively or electrostatically coupled to an electrical maintaining circuit in a manner similar to that commonly used for maintaining a quartz crystal in oscillation.

What I claim is:

1. A mechanical oscillator having an oscillating member, a complementary member coupled by magnetic flux to said oscillating member, means providing a restoring force for the oscillating member, said oscillating member having a repose position substantially midway between its extreme positions during oscillation, means associated with one of said members and disposed symmetrically on both sides of the repose position of the oscillating member for modifying the reluctance between the oscillating member and the complementary member to thereby modify said restoring force to effect isochronism of said oscillating member.

2. Magnetic escapement mechanism embodying a mechanical oscillator according to claim 1 and having relatively rotatable and oscillatable parts, the latter subject to a restoring force giving substantial isochronism, coupled together by means of a magnetic coupling of the kind referred to, characterised by means for counteracting parasitic forces tending to alter the restoring force whereby anisochronism is reduced.

3. Magnetic escapement mechanism according to claim 2, in which said means comprises magnetic members adjacent the oscillating pole-shaped member arranged to induce a correcting force equal and opposite to the parasitic restoring force of the magnetic flux.

4. Magnetic escapement mechanism comprising relatively rotatable and oscillatable members coupled together by magnetic flux, the oscillatable member having a repose position substantially midway between its extreme positions during oscillation, and said oscillatable member comprising a pole-shaped member and said rotatable member having a cooperating wavy magnetic path thereon, means providing a restoring force for said oscillatable member, additional magnetic means adjacent to and influencing said pole-shaped member and on both sides of the repose position thereof to alter the force tending to restore the oscillatable member to reduce parasitic forces in said oscillatable member.

5. Magnetic escapement mechanism comprising relatively rotatable and oscillatable members coupled together by magnetic flux, the oscillatable member having a repose position substantially midway between its extreme positions during oscillation, and said oscillatable member comprising a pole-shaped member and said rotatable member having a cooperating wavy magnetic path thereon, means providing a restoring force for said oscillatable member, additional magnetic means adjacent to and influencing said pole-shaped member to alter the force tending to restore the oscillatable member to reduce parasitic forces in said oscillatable member, said additional magnetic means comprising a magnetic pole projection upon each side of the repose position of said pole-shaped member.

6. A magnetic escapement for a timepiece of the type comprising a wavy magnetic track having a sinuous form with apical extensions on both sides thereof and a complementary magnetic oscillating element having a repose position substantially midway between its extreme positions during oscillation and having polar formations adapted to follow said track, a rotor carrying said magnetic track whereby the speed of rotation of the rotor is controlled by the frequency of oscillation of the magnetic element, and a further magnetic element associated with the polar formations on each side of the repose position of the oscillating element disposed between its repose position and its positions at the outer limit of its vibrations so as to provide a force opposed to the restoring force of the oscillatory system, said opposed force being of decreasing effect toward the position of repose for the purpose of effecting isochronous correction of the oscillations of the oscillatory member.

7. A magnetic escapement mechanism having an oscillating member, a rotating member coupled by magnetic flux to said oscillating member, means providing a restoring force for the oscillating member, said oscillating member having a repose position substantially midway between its extreme positions during oscillation, means associated with one of said members and spaced from the repose position of the oscillating member in the direction of movement of the latter and disposed between its repose position and its extreme positions during oscillation for modifying the reluctance between the oscillating member and the rotating member to apply a greater restoring force to the oscillating member at large amplitudes of vibration than at small amplitudes of vibration and thereby effect isochronism of said oscillating member.

8. A magnetic escapement mechanism having an oscillating member, a rotating member coupled by magnetic flux to said oscillating member, means providing a restoring force for the oscillating member, a magnetic element associated with said oscillating member being disposed in a position spaced from the plane of the repose position of the oscillating member in the direction of its oscillation and disposed between its repose position and its extreme positions during oscillation, said element modifying the reluctance between the oscillating member and the rotating member to apply a greater restoring force to the oscillating member at large amplitudes of vibration than at small amplitudes of vibration and thereby effect isochronism of said oscillating member.

9. A magnetic escapement for a time piece of the type comprising a wavy magnetic track of sinuous form with apical extensions on both sides thereof, and a complementary magnetic oscillating element having polar formations adapted to follow said track and having a repose position substantially midway between its extreme positions during oscillation, a rotor carrying said magnetic track whereby the speed of rotation of the rotor is controlled by the frequency of oscillation of the magnetic element, and a further magnetic element associated with the polar formations and spaced therefrom in the direction of oscillation of the magnetic element so as to be disposed between its repose position and its positions at the outer limit of its vibrations so as to provide a force opposed to the restoring force of the oscillating element during that part of the oscillation of the latter between its repose position and the position of the further magnetic element, said opposed force being of decreasing effect toward the position of repose for the purpose of effecting isochronous correction of the oscillations of the oscillating element.

10. A magnetic escapement mechanism as in claim 7 wherein the means for modifying the reluctance between the oscillating member and the rotating member is adjustable to vary its effect upon such reluctance.

References Cited in the file of this patent

UNITED STATES PATENTS

| | | |
|---|---|---|
| 708,769 | Inden | Sept. 9, 1902 |
| 1,277,371 | Boyle | Sept. 3, 1918 |
| 1,825,382 | Baker | Sept. 29, 1931 |
| 2,373,429 | Straumann | Apr. 10, 1945 |
| 2,376,461 | Straumann | May 22, 1945 |
| 2,554,523 | Clifford | May 29, 1951 |
| 2,571,085 | Clifford | Oct. 9, 1951 |